(12) United States Patent
Glebov et al.

(10) Patent No.: US 12,066,061 B2
(45) Date of Patent: Aug. 20, 2024

(54) CENTRAL RELEASE MECHANISM AND METHOD FOR MOUNTING A CENTRAL RELEASE MECHANISM

(71) Applicant: Schaeffler Technologies AG & Co. KG, Herzogenaurach (DE)

(72) Inventors: Alexander Glebov, Bühl (DE); Marcel Röll, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/554,228

(22) PCT Filed: Mar. 18, 2022

(86) PCT No.: PCT/DE2022/100212
§ 371 (c)(1),
(2) Date: Oct. 6, 2023

(87) PCT Pub. No.: WO2022/214130
PCT Pub. Date: Oct. 13, 2022

(65) Prior Publication Data
US 2024/0183408 A1 Jun. 6, 2024

(30) Foreign Application Priority Data
Apr. 7, 2021 (DE) .......................... 102021108646.9

(51) Int. Cl.
*F16D 25/08* (2006.01)
(52) U.S. Cl.
CPC ........ *F16D 25/083* (2013.01); *F16D 2300/08* (2013.01)

(58) Field of Classification Search
CPC .......................... F16D 25/083; F16D 2300/08
See application file for complete search history.

(56) References Cited

U.S. PATENT DOCUMENTS

| | | | |
|---|---|---|---|
| 6,938,536 B2 * | 9/2005 | Braun | F16D 25/083 92/169.1 |
| 2001/0011626 A1 * | 8/2001 | Meyer | F16D 25/083 192/85.51 |

(Continued)

FOREIGN PATENT DOCUMENTS

| | | |
|---|---|---|
| DE | 10018926 | 11/2000 |
| DE | 102014206476 | 10/2014 |

(Continued)

*Primary Examiner* — Lori Wu
(74) *Attorney, Agent, or Firm* — Volpe Koenig

(57) ABSTRACT

A central release mechanism, in particular for a hydraulic release system of a clutch system of a motor vehicle, including a central release mechanism housing with an annular central release mechanism piston chamber in which a central release mechanism piston is received axially movably by a hydraulic liquid that can be supplied to the central release mechanism piston chamber. The central release mechanism has at least one central release mechanism piston seal which seals the central release mechanism piston with respect to the central release mechanism piston chamber, and the central release mechanism piston seal is arranged in the central release mechanism housing so as to be axially secured at least on one side by a securing ring, the securing ring being connectable to the central release mechanism housing by means of a bayonet connection.

19 Claims, 3 Drawing Sheets

(56) References Cited

U.S. PATENT DOCUMENTS

| | | | |
|---|---|---|---|
| 2003/0029692 A1* | 2/2003 | Rogner | F16D 25/087 |
| | | | 192/112 |
| 2007/0175726 A1 | 8/2007 | Combes et al. | |
| 2011/0155529 A1* | 6/2011 | Adolph | F16D 25/126 |
| | | | 192/48.1 |

FOREIGN PATENT DOCUMENTS

| | | |
|---|---|---|
| DE | 102016219443 | 4/2018 |
| DE | 102017119680 | 2/2019 |
| DE | 102017122529 | 3/2019 |
| DE | 102018117706 | 1/2020 |
| EP | 0773127 | 2/2002 |

\* cited by examiner

CENTRAL RELEASE MECHANISM AND METHOD FOR MOUNTING A CENTRAL RELEASE MECHANISM

CROSS-REFERENCE TO RELATED APPLICATIONS

This application is the U.S. National Phase of PCT Appln. No. PCT/DE2022/100212, filed Mar. 18, 2022, which claims priority from German Patent Application No. 10 2021 108 646.9, filed Apr. 7, 2021, the entire disclosures of which are incorporated by reference herein.

TECHNICAL FIELD

The disclosure relates to a central release mechanism, in particular for a hydraulic release system of a clutch system of a motor vehicle, comprising a central release mechanism housing with an annular central release mechanism piston chamber in which a central release mechanism piston is received axially movably by a hydraulic liquid that can be supplied to the central release mechanism piston chamber, wherein the central release mechanism has at least one central release mechanism piston seal which seals the central release mechanism piston with respect to the central release mechanism piston chamber. The disclosure further relates to a method for mounting a central release mechanism.

BACKGROUND

A drive train of a hybrid vehicle comprises a combination of an internal combustion engine and an electric motor and enables—for example in urban areas—a purely electric mode of operation with sufficient range and availability, in particular when driving overland. In addition, there is the possibility of driving the internal combustion engine and the electric motor at the same time in certain operating situations.

As is known from EP0773127A1, DE10018926A1 and US2007/0175726A1, a first clutch arrangement can be arranged between the internal combustion engine and the electric motor to separate the internal combustion engine from the electric motor and the rest of the drive train of the hybrid vehicle. In the case of a purely electric drive, the first clutch arrangement is then opened and the internal combustion engine switched off, so that the output torque of the hybrid vehicle is generated solely by the electric motor.

Such, mostly fully hydraulically operated clutch systems of hybrid vehicles can be equipped with a central release mechanism, which is often also referred to as a concentric slave cylinder (CSC). This can in particular consist of an annular hydraulic central release cylinder with an integrated release bearing, which is arranged in the middle of the clutch shaft.

These central release mechanisms for a clutch system of a motor vehicle generally have a central release mechanism housing with an annular central release mechanism piston chamber in which a central release mechanism piston is accommodated so that it can move axially through a hydraulic liquid that can be fed to the central release mechanism piston chamber. To seal the central release mechanism piston from the central release mechanism housing, such a central release mechanism has at least one central release mechanism piston seal, which must be fixed in the central release mechanism housing.

The difficulty in securing these central release mechanism piston seals axially is that, in particular with a large diameter of a central release mechanism piston seal, a high supporting force is required, which is evenly distributed over the circumference of the central release mechanism piston seal.

SUMMARY

It is therefore the object of the present disclosure to provide a central release mechanism that at least reduces or completely eliminates the problems of the prior art and allows a high and reliable sealing effect as well as simple and reliable mounting. It is also the object of the disclosure to provide an improved method for mounting a central release mechanism.

This object is achieved by a central release mechanism in particular for a hydraulic release system of a clutch system of a motor vehicle, comprising a central release mechanism housing with an annular central release mechanism piston chamber in which a central release mechanism piston is received axially movably by a hydraulic liquid that can be supplied to the central release mechanism piston chamber, wherein the central release mechanism has at least one central release mechanism piston seal which seals the central release mechanism piston with respect to the central release mechanism piston chamber, wherein the central release mechanism piston seal is arranged in the central release mechanism housing so as to be axially secured at least on one side by a retaining ring, the retaining ring being connectable to the central release mechanism housing by means of a bayonet connection.

By connecting the retaining ring to the central release mechanism housing by means of a bayonet connection, a high contact pressure can be applied that is evenly applied over the circumference of the central release mechanism piston seal, which ensures that this hydraulic interface is securely sealed. During mounting, this can be carried out without forming only by means of form-fitting and, if necessary, force-fitting connection methods. The mounting can be carried out, for example, with a simple tool, possibly even without the need to use a machine for this purpose. The correct mounting state can be verified using a gauge, a camera and/or a pressure test.

A bayonet connection thus allows a simple and secure mechanical connection between the central release mechanism housing and the retaining ring that can be manufactured and released during mounting by plugging them into one another and turning them in opposite directions. The connection is thus made via an ergonomically favorable plugging and rotating movement.

First, the individual elements disclosed herein are explained in the order in which they are named in the claims and particularly preferred embodiments of the subject matter of the disclosure are described below.

The central release mechanism according to the disclosure is preferably intended for use in a hydraulic release system. A hydraulic release system usually has a master cylinder that transmits the pressure generated on the master cylinder to the slave cylinder, in this case a central release mechanism, via a hydraulic pressure line. The hydraulic pressure can in particular also be provided by means of a power pack, which consists of a hydraulic pump and a hydraulic pressure accumulator that can be acted upon by the hydraulic pump. In this case, a pressure chamber of the slave cylinder can also be pressurized hydraulically, for example, by a master cylinder that is controlled by a control unit by means of an electric motor, or by a hydraulic pump, optionally with the cooperation of a pressure accumulator. A power pack can be used in an advantageous manner, which switches a plurality of pressure circuits, in particular, via a central hydraulic pump and corresponding valves.

In the present case, the slave cylinder, designed as a central release mechanism, transmits the hydraulic pressure to a lever system in the hydraulic release system by means of an axially displaceable piston and with the interposition of a clutch release bearing, which can be formed, for example, by a disk spring. The disk spring acts on a clutch pressure plate which is connected to a clutch housing in a rotationally fixed and axially displaceable manner and is braced against a pressure plate which is fixedly connected to the clutch housing. A clutch disk with a clutch lining is arranged between the pressure plate and the clutch pressure plate, which, depending on the tension between the pressure plate and the clutch pressure plate, form a frictional connection and close the friction clutch or open it when the frictional connection is removed.

The hydraulic clutch release system particularly preferably actuates a friction clutch of the clutch system hydraulically by acting on the master cylinder. This can be done—as explained—either by means of an actuator that is controlled by a control unit or by manual actuation by the driver using a clutch pedal.

The central release mechanism can be used particularly preferably in a clutch system for motor vehicles. The clutch system has the function of engaging or disengaging the driving side of the motor in a drive train of a vehicle from the transmission side in a shiftable manner and thus enabling, for example, a gear change of the transmission while driving and thereby being able to operate the driving motor in a preferred speed/torque range, or to engage an electric motor or an internal combustion engine from or into a drive train.

For the purposes of this application, motor vehicles are land vehicles that are moved by machine power without being restricted to railroad tracks. A motor vehicle can be selected, for example, from the group of passenger cars, trucks, small motorcycles, light motor vehicles, motorcycles, motor buses/coaches or tractors. The central release mechanism is particularly preferably provided for use in a hybrid electric vehicle. A hybrid electric vehicle (HEV) is an electric vehicle that is driven by at least one electric motor and another energy converter and draws energy from its electrical storage unit (battery) as well as from an additional fuel that it carries.

The central release mechanism according to the disclosure has a central release mechanism housing. The central release mechanism housing has the function of accommodating components of the central release mechanism, in particular the moving central release mechanism pistons, and protecting them from external mechanical or chemical influences. Furthermore, the central release mechanism housing has the function of allowing for a simple assembly and fixing of the central release mechanism within the drive train. The central release mechanism housing can be made in one piece or in multiple pieces. The central release mechanism housing can preferably be formed from a plastic, a metallic material and/or a ceramic material. The central release mechanism piston chamber formed in the central release mechanism housing serves to accommodate and guide the central release mechanism piston, which is linearly movably mounted in the central release mechanism housing.

The central release mechanism according to the disclosure also has a central release mechanism piston. The central release mechanism piston has the function of converting hydraulic pressurization into a linear displacement of the central release mechanism piston, wherein the effect of which is that the clutch system can be transferred from an engaged operating state to a disengaged operating state. The central release mechanism can have an annular central release mechanism piston or several central release mechanism pistons (multi-piston release mechanisms).

Furthermore, the central release mechanism according to the disclosure has at least one central release mechanism piston seal. The central release mechanism piston seal seals the linearly movable central release mechanism piston from the central release mechanism housing that accommodates the central release mechanism piston. The central release mechanism piston seal can be designed in particular as a sealing ring. It is particularly preferred that the central release mechanism piston seal is formed from an elastic, particularly preferably rubber-elastic material. The elastic material can preferably consist entirely or partially of an elastomer, wherein the elastomers in turn are preferably selected from the group of natural rubber vulcanizates and silicone rubber.

In a hydraulic release system of a motor vehicle, the hydraulic liquid has the function of transmitting energy in the form of pressure with as little loss as possible, for example within a vehicle's clutch system. In addition to this main object, the hydraulic liquid can in particular also provide lubrication and corrosion protection for the moving parts and the metal surfaces of the hydraulic release system. In addition, it can in particular also dissipate impurities (for example due to abrasion), water and air as well as waste heat.

It is particularly preferred that the central release mechanism according to the disclosure is used in a hybrid module. In a hybrid module, structural and functional elements of a hybridized drive train can be spatially and/or structurally combined and preconfigured so that a hybrid module can be integrated into a drive train of a motor vehicle in a particularly simple manner. In particular, an electric motor and a clutch system, in particular with a separating clutch for engaging the electric motor in and/or disengaging the electric motor from the drive train, can be present in a hybrid module.

A hybrid module can be divided into the following categories P0-P4 depending on the point of engagement of the electric motor in the drive train:

P0: the electric motor is arranged upstream of the internal combustion engine and is coupled to the internal combustion engine by means of a belt, for example. With this arrangement of the electric motor, it is also sometimes referred to as a belt-driven starter generator (BSG), P1: the electric motor is arranged directly behind the internal combustion engine. The electric motor can be arranged, for example, fixed to the crankshaft in front of the starting clutch, P2: the electric motor is arranged between a separating clutch, often referred to as KG, and the starting clutch but before the vehicle transmission in the drive train, P3: the electric motor is arranged in the vehicle transmission and/or transmission output shaft, P4: the electric motor is arranged on an existing or separate vehicle axle and P5: the electric motor is arranged on or in the vehicle wheel, for example as a wheel hub motor.

In connection with the present disclosure, it is particularly preferred that the central release mechanism is used in a P2 hybrid module to actuate a separating clutch.

According to a preferred embodiment, it can be advantageous that the central release mechanism piston seal rests against the radially outer section of the central release mechanism piston.

Furthermore, it can be advantageous for the retaining ring to have first form-fitting means directed radially outwards, which form a bayonet connection with corresponding second form-fitting means of the central release mechanism housing. In a further development according to the disclosure, it can also be preferred in this context that the second form-fitting means of the central release mechanism housing are designed as grooves that open radially inward. In particular, this has the advantage that the radially outwardly directed first form-fitting means are clearly visible during mounting and can thus be inserted easily and in a controlled manner into the corresponding second form-fitting means of the central release mechanism housing.

Furthermore, it can be advantageous that the retaining ring has third form-fitting means directed radially inwards, which form a bayonet connection with corresponding fourth form-fitting means of the central release mechanism housing. In this way, for example, a claw-like bayonet connection can be realized in which the retaining ring at least partially surrounds the central release mechanism housing on its radially outer lateral surface.

According to a further advantageous embodiment of the disclosure, it can be preferred that the central release mechanism housing and/or the retaining ring has/have at least one locking element, which fixes the retaining ring in its mounting position, when it is fully inserted in the bayonet connection, relative to the central release mechanism housing in a form-fitting and/or force-fitting manner, so that the retaining ring is secured in its closed position.

According to a preferred embodiment of the disclosure, it can be advantageous that the retaining ring and the central release mechanism housing are configured in such a way that the retaining ring is coupled to the central release mechanism housing via the bayonet connection by means of a rotation of the retaining ring counter to the direction of rotation of a release bearing connected to the central release mechanism, whereby an unintentional loosening of the retaining ring can be counteracted.

Furthermore, it can be advantageous that the central release mechanism has a second central release mechanism piston seal for sealing the central release mechanism piston against the central release mechanism housing, which is arranged radially below the first central release mechanism piston seal and which is secured at least on one side axially with respect to the central release mechanism housing by means of the first retaining ring or a second retaining ring. In this way, on the one hand, an improved sealing effect of both central release mechanism piston seals can be achieved and, on the other hand, simplified mounting can be achieved.

In a further development according to the disclosure, it can also be preferred that the central release mechanism housing, the first retaining ring and/or the second retaining ring is/are formed from a plastic, as a result of which the bayonet connection can be designed in a particularly cost-effective and functionally reliable manner.

The object is also achieved by a method for mounting a central release mechanism, comprising the following steps:
a) providing a central release mechanism housing with an annular central release mechanism piston chamber in which an axially displaceable central release mechanism piston is accommodated, which is sealed off from the central release mechanism housing by at least one central release mechanism piston seal,
b) providing a retaining ring, wherein the central release mechanism housing and the retaining ring are configured to form a bayonet connection with one another,
c) axially inserting the retaining ring in and/or on the central release mechanism housing,
d) rotating the retaining ring in relation to the central release mechanism housing into the closed position of the bayonet connection, and
e) measuring the mounting position of the retaining ring.

The mounting position can be measured, for example, by means of optical sensors, such as a camera in particular.

BRIEF DESCRIPTION OF THE DRAWINGS

The disclosure will be explained in more detail below with reference to figures without limiting the general concept according to the disclosure. The drawings are only schematic in nature and serve only for understanding the disclosure. The same elements are provided with the same reference signs. The different features of the various exemplary embodiments can also be freely combined with one another as technically feasible.

In the figures.

DETAILED DESCRIPTION

Figure 1:
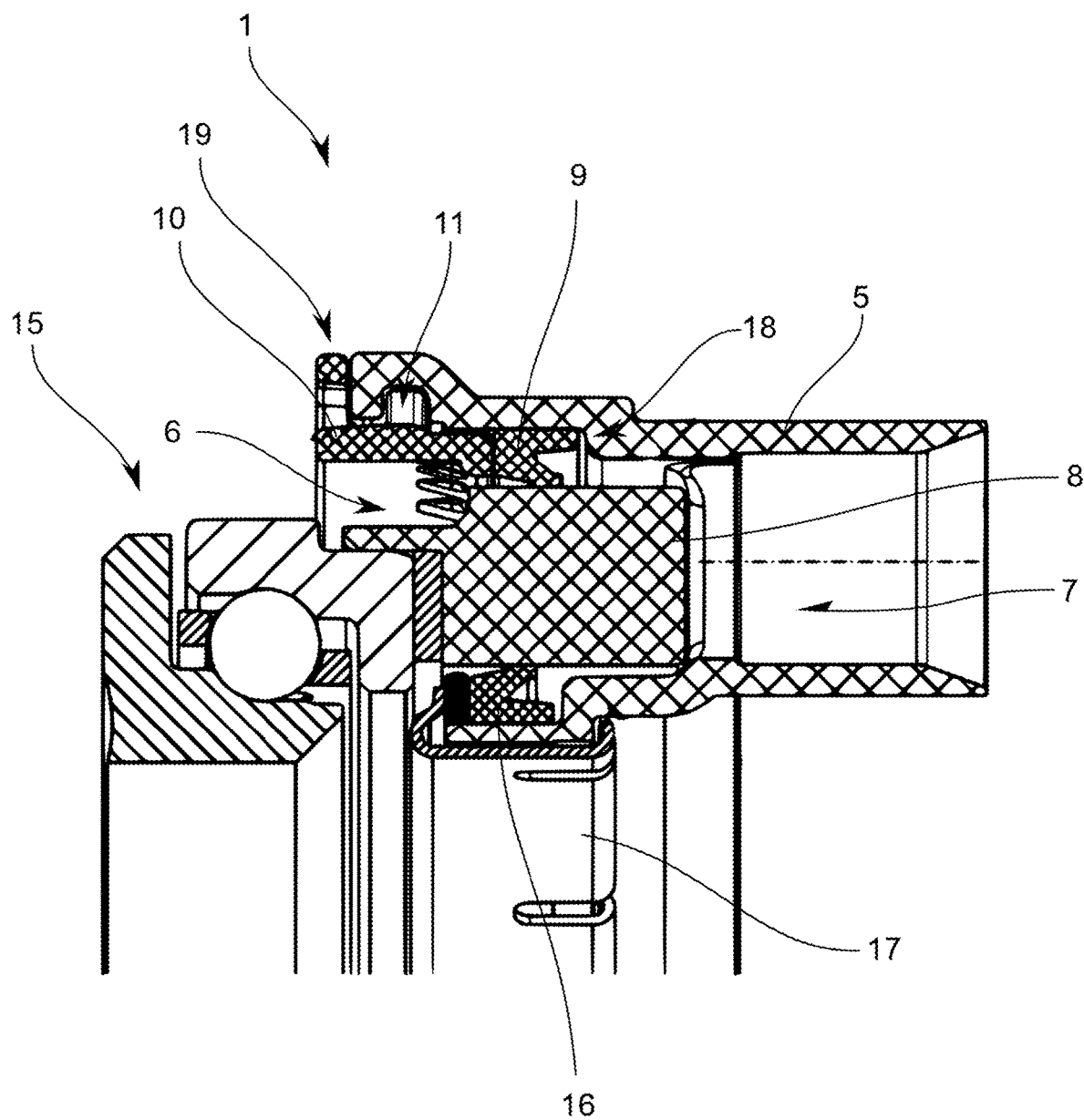
FIG. 1 shows a first embodiment of a central release mechanism in an axial sectional view.
Figure 3:
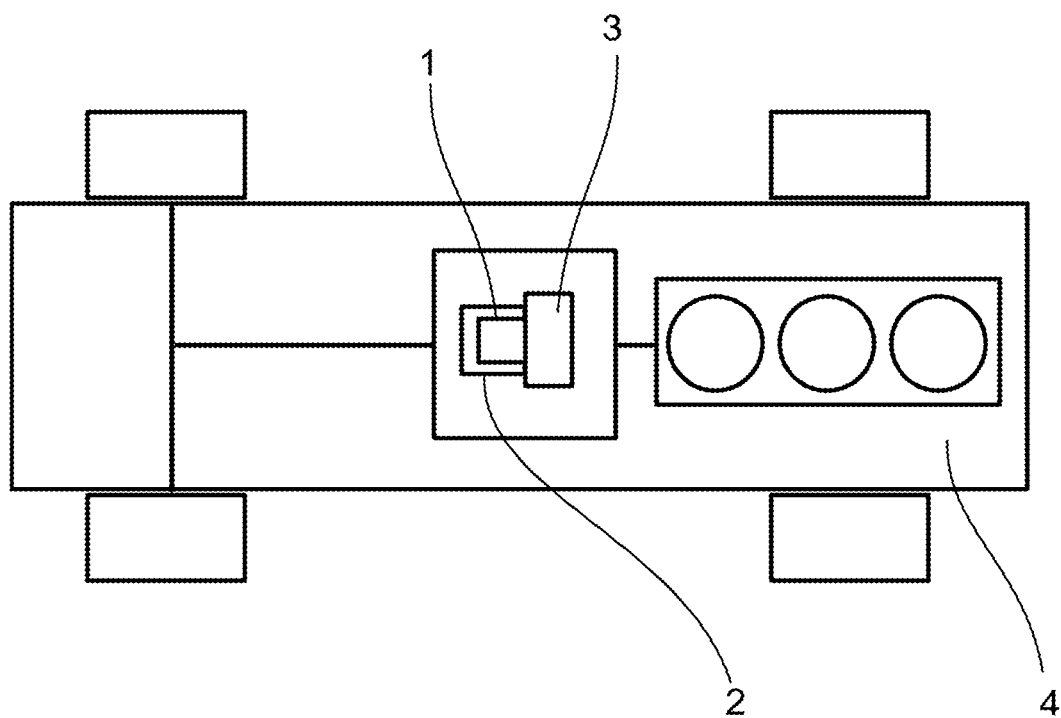
FIG. 3 shows a motor vehicle with a central release mechanism in a schematic block view.

FIG. 1 shows a central release mechanism 1 for a hydraulic release system 2 of a clutch system 3 of a motor vehicle 4, as shown by way of example in FIG. 3. The central release mechanism 1 comprises a central release mechanism housing 5 with an annular central release mechanism piston chamber 6, in which a central release mechanism piston 8 is accommodated in an axially movable manner through a hydraulic liquid 7 that can be fed to the central release mechanism piston chamber 6.

To seal the central release mechanism piston chamber 6 from the environment, the central release mechanism 1 has a first annular central release mechanism piston seal 9, which seals the central release mechanism piston 8, which is also annular, against the central release mechanism piston chamber 6. The central release mechanism piston seal 9 is arranged in the central release mechanism housing 5 secured on one side axially by a retaining ring 10, wherein the retaining ring 10 can be connected to the central release mechanism housing 5 by a bayonet connection. In the other axial direction, the central release mechanism piston seal 9 rests against a shoulder 18 that extends radially inward from the central release mechanism housing 5, so that the central release mechanism piston seal 9 is secured axially on both sides.

The central release mechanism 1 of FIG. 1 also has a second central release mechanism piston seal 16 for sealing the central release mechanism piston 8 in relation to the central release mechanism housing 5, which is arranged radially below the first central release mechanism piston seal 9. This second central release mechanism piston seal 16 can be secured at least on one side axially relative to the central release mechanism housing 5 by means of the first retaining ring 10 or—as shown in FIG. 1—by means of a second retaining ring 17. The first central release mechanism piston seal 9 and the second central release mechanism piston seal 16 are static relative to the central release mechanism housing 5—i.e., they are not movable.

In the exemplary embodiment shown in FIG. 1, the central release mechanism piston seal 9 rests against the radially outer section of the central release mechanism piston 8. In this configuration, the retaining ring 10 has a lug-like first form-fitting means directed radially outwards, which forms a bayonet connection with corresponding second form-fitting means 11 of the central release mechanism housing 5. The second form-fitting means 11 of the central release mechanism housing 5 are designed as radially inwardly opening grooves.

However, it is also possible for the retaining ring 10 to have third form-fitting means 12 directed radially inwards, which form a bayonet connection with corresponding fourth form-fitting means 13 of the central release mechanism housing 5. This is shown in FIG. 2.

In all the exemplary embodiments shown, it is possible for the central release mechanism housing 5 and/or the retaining ring 10 to have at least one locking element 14, which holds the retaining ring 10 in a force-fitting and/or form-fitting manner in its mounting position, when it is fixed fully inserted in the bayonet connection, relative to the central release mechanism housing 5.

Furthermore, for all the exemplary embodiments shown, the retaining ring 10 and the central release mechanism housing 5 can be configured in such a way that the retaining ring 10 is coupled to the central release mechanism housing 5 via the bayonet connection by rotating the retaining ring 10 counter to the direction of rotation of a release bearing 15 connected to the central release mechanism 1.

Figure 2:
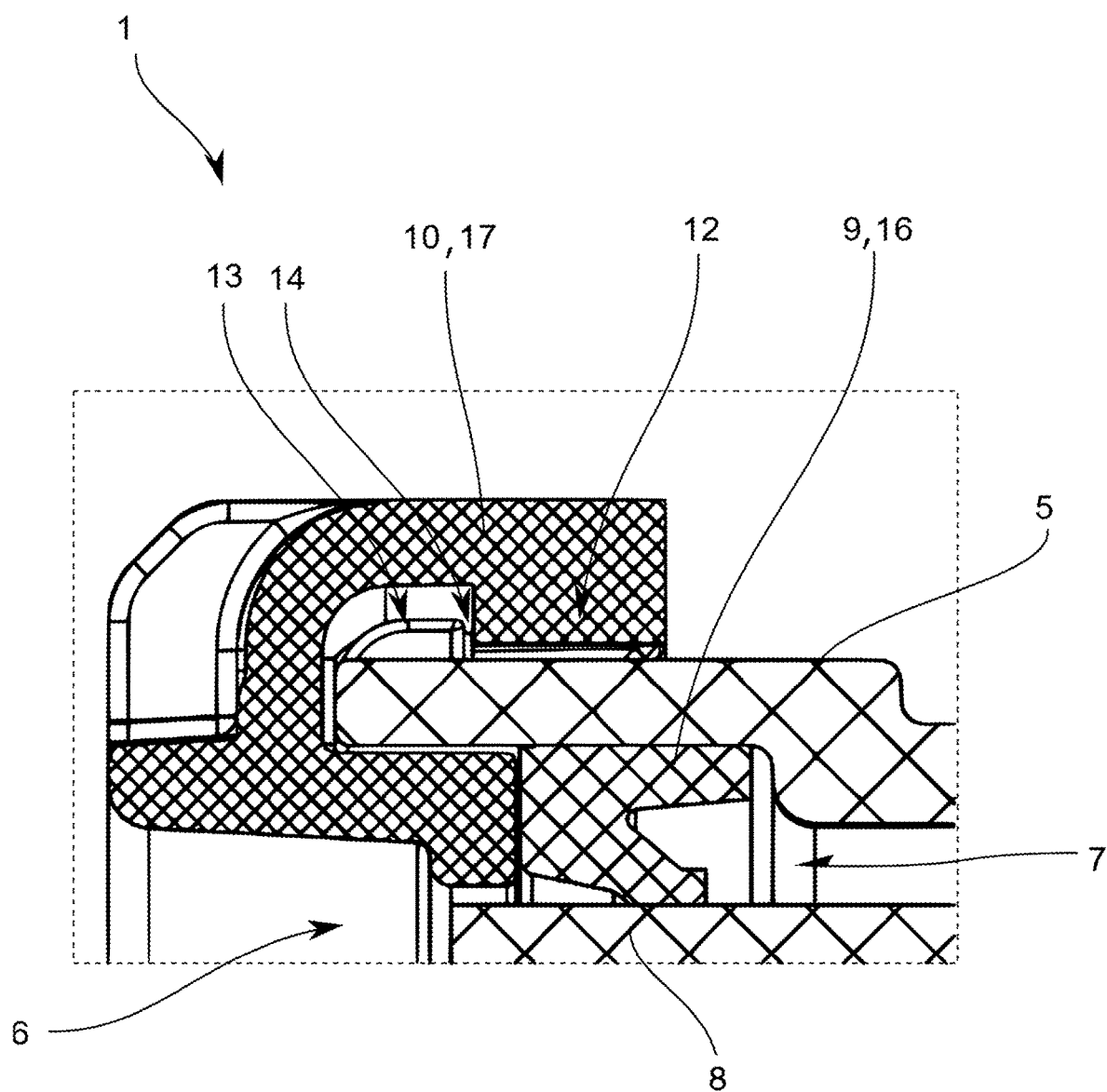
FIG. 2 shows a first embodiment of a central release mechanism in a schematic axial sectional view.

In the case of the central release mechanism 1 shown in FIGS. 1-2, the central release mechanism housing 5, the first retaining ring 10 and/or the second retaining ring 17 can be formed from a plastic.

The following steps can be carried out to mount a central release mechanism 1:
a) providing a central release mechanism housing 5 with an annular central release mechanism piston chamber 6 in which an axially displaceable central release mechanism piston 8 is accommodated, which is sealed off from the central release mechanism piston housing 5 by at least one central release mechanism piston seal 9,
b) providing a retaining ring 10, wherein the central release mechanism housing 5 and the retaining ring 10 are configured to form a bayonet connection with one another,
c) axially inserting the retaining ring 10 in and/or on the central release mechanism housing 5,
d) rotating the retaining ring 10 in relation to the central release mechanism housing 5 into the closed position of the bayonet connection, and
measuring the mounting position of the retaining ring 10.

Thus, as indicated in FIG. 1, circumferentially distributed lugs projecting in the radial direction from the retaining ring 10 can be arranged on the retaining ring 10 as a first form-fitting means. These lug-like first form-fitting means of the retaining ring 11 engage in the corresponding grooves (second form-fitting means 11) of the central release mechanism housing 5 and can be converted into a defined end position of the bayonet connection by a combined axial-circumferential rotary movement. This determines the position of the retaining ring 10 in relation to the central release mechanism housing 5. If the lugs are not snapped in correctly or not all the way around, this can be checked, for example, simply by measuring the distance, in particular using sensors.

In order to recognize the end position of the retaining ring 10 during assembly, stops 19 can be provided on the retaining ring 10 and/or the central release mechanism housing 5.

The disclosure is not limited to the embodiments shown in the figures. The above description is therefore not to be regarded as limiting, but rather as illustrative. The following claims are to be understood as meaning that a named feature is present in at least one embodiment. This does not exclude the presence of further features. If the patent claims and the above description define 'first' and 'second' features, this designation serves to distinguish between two features of the same type without defining an order of precedence.

LIST OF REFERENCE SYMBOLS

1 Central release mechanism
2 Hydraulic release system
3 Clutch system
4 Motor vehicle
5 Central release mechanism housing
6 Central release mechanism piston chamber
7 Hydraulic liquid
8 Central release mechanism piston
9 Central release mechanism piston seal
10 Retaining ring
11 Second form-fitting means
12 Third form-fitting means
13 Fourth form-fitting means
14 Locking element
15 Release bearing
16 Second central release mechanism piston seal
17 Second retaining ring
18 Shoulder
19 Stop

The invention claimed is:

1. A central release mechanism, comprising:
a central release mechanism housing with an annular central release mechanism piston chamber in which a central release mechanism piston is received axially movably by a hydraulic liquid that is suppliable to the central release mechanism piston chamber;
at least one central release mechanism piston seal which seals the central release mechanism piston with respect to the central release mechanism piston chamber; and
the central release mechanism piston seal is arranged in the central release mechanism housing so as to be axially secured at least on one side by a retaining ring, the retaining ring being connectable to the central release mechanism housing by a bayonet connection.

2. The central release mechanism according to claim 1, wherein the central release mechanism piston seal bears against a radially outer section of the central release mechanism piston.

3. The central release mechanism according to claim 1, wherein the retaining ring has a radially outwardly directed first form-fitting portion that forms the bayonet connection with a corresponding second form-fitting portion of the central release mechanism housing.

4. The central release mechanism according to claim 3, wherein the second form-fitting portion of the central release mechanism housing comprises radially inwardly opening grooves.

5. The central release mechanism according to claim 1, wherein the retaining ring has a radially inwardly directed third form-fitting portion which forms the bayonet connection with a corresponding fourth form-fitting portion of the central release mechanism housing.

6. The central release mechanism according to claim 1, wherein at least one of the central release mechanism housing or the retaining ring has at least one locking element which fixes the retaining ring in a fully inserted mounting position in the bayonet connection in at least one of a force-fitting or form-fitting manner relative to the central release mechanism housing.

7. The central release mechanism according to claim 1, wherein the retaining ring and the central release mechanism housing are configured such that a coupling of the retaining ring with the central release mechanism housing takes place via the bayonet connection by a rotation of the retaining ring against a direction of rotation of a release mechanism bearing connected with the central release mechanism.

8. The central release mechanism according to claim 1, further comprising a second central release mechanism piston seal for sealing the central release mechanism piston relative to the central release mechanism housing, which is arranged radially below the first central release mechanism piston seal and which is secured at least on one side axially with respect to the central release mechanism housing by the first retaining ring or a second retaining ring.

9. The central release mechanism according to claim 8, wherein at least one of the central release mechanism housing, the first retaining ring or the second retaining ring is formed from plastic.

10. The central release mechanism of claim 1, wherein the central release mechanism is a hydraulic release system of a clutch system of a motor vehicle.

11. A method for mounting a central release mechanism, comprising the following steps:
 a) providing a central release mechanism housing with an annular central release mechanism piston chamber in which an axially displaceable central release mechanism piston is accommodated, which is sealed off from the central release mechanism piston housing by at least one central release mechanism piston seal;
 b) providing a retaining ring, the central release mechanism housing and the retaining ring are configured to form a bayonet connection with one another;
 c) axially inserting the retaining ring at least one of in or on the central release mechanism housing;
 d) rotating the retaining ring in relation to the central release mechanism housing into a closed position of the bayonet connection, such that the central release mechanism piston seal is axially secured in the central release mechanism housing at least on one side by the retaining ring; and
 e) measuring the mounting position of the retaining ring.

12. A central release mechanism, comprising:
 a central release mechanism housing with an annular central release mechanism piston chamber in which an annular central release mechanism piston is received axially movably by a hydraulic liquid that is suppliable to the central release mechanism piston chamber;
 an annular central release mechanism piston seal which seals an outer surface of the central release mechanism piston with respect to the central release mechanism piston chamber; and
 the annular central release mechanism piston seal is axially secured in the central release mechanism housing at least on one side by a retaining ring that is connectable by a bayonet connection to the central release mechanism housing.

13. The central release mechanism according to claim 12, wherein the retaining ring has a radially outwardly directed first form-fitting portion that forms the bayonet connection with a corresponding second form-fitting portion of the central release mechanism housing.

14. The central release mechanism according to claim 13, wherein the second form-fitting portion of the central release mechanism housing comprises radially inwardly opening grooves.

15. The central release mechanism according to claim 12, wherein the retaining ring is U-shaped in cross-section and includes a radially inwardly directed form-fitting portion which forms the bayonet connection with a corresponding form-fitting portion on a radially outer surface of the central release mechanism housing.

16. The central release mechanism according to claim 12, wherein at least one of the central release mechanism housing or the retaining ring has at least one locking element which fixes the retaining ring in a fully engaged mounting position of the bayonet connection in at least one of a force-fitting or form-fitting manner relative to the central release mechanism housing.

17. The central release mechanism according to claim 12, wherein the retaining ring and the central release mechanism housing are configured such that a coupling of the retaining ring with the central release mechanism housing takes place via the bayonet connection by a rotation of the retaining ring relative to the central release mechanism housing.

18. The central release mechanism according to claim 12, further comprising a second central release mechanism piston seal for sealing a radially inner surface of the central release mechanism piston relative to the central release mechanism housing, which is arranged radially inwardly of the annular central release mechanism piston seal and which is secured at least on one side axially with respect to the central release mechanism housing by a second retaining ring.

19. The central release mechanism according to claim 18, wherein at least one of the central release mechanism housing, the retaining ring or the second retaining ring is formed from plastic.

* * * * *